United States Patent [19]

Bauer

[11] Patent Number: 4,797,139
[45] Date of Patent: Jan. 10, 1989

[54] BOEHMITE PRODUCED BY A SEEDED HYDYOTHERMAL PROCESS AND CERAMIC BODIES PRODUCED THEREFROM

[75] Inventor: Ralph Bauer, Niagara Falls, Canada
[73] Assignee: Norton Company, Worcester, Mass.
[21] Appl. No.: 133,584
[22] Filed: Dec. 16, 1987

Related U.S. Application Data

[63] Continuation-in-part of Ser. No. 84,549, Aug. 11, 1987, abandoned.
[51] Int. Cl.$^4$ .............................................. B24D 3/00
[52] U.S. Cl. ...................................... 51/293; 51/309; 423/628
[58] Field of Search .................... 51/293, 309; 423/628

[56] References Cited

U.S. PATENT DOCUMENTS 3,615,306 10/1971 Worcester .............................. 51/309
4,297,325 10/1981 Scherizer et al. ................... 423/625
4,543,107 9/1985 Rue ....................................... 51/309
4,574,003 3/1986 Gerk .................................... 51/309
4,623,364 11/1986 Cottringer et al. .................. 51/309

Primary Examiner—Paul Lieberman
Assistant Examiner—Willie J. Thompson
Attorney, Agent, or Firm—Arthur A. Loiselle, Jr.

[57] ABSTRACT

Microcrystalline boehmite suitable for conversion to anhydrous alumina products is produced by hydrothermal treatment of precursor alumina raw material at controlled pH and in the presence of microcrystalline boehmite seed material. Reaction mix may include submicron seed material for seedling for later conversion of the microcrystalline boehmite to alpha alumina. Removal of metal cations by ion exchange is employed when high purity product is required. Other materials may be added to reaction mix. Production of alumina products, catalysts, and ceramic bodies is disclosed.

27 Claims, No Drawings

BOEHMITE PRODUCED BY A SEEDED HYDYOTHERMAL PROCESS AND CERAMIC BODIES PRODUCED THEREFROM

This is a continuation-in-part application of original application Ser. No. 07/084,549 filed Aug. 11, 1987 now abandoned.

BACKGROUND OF THE INVENTION

The production of ceramic articles in general and of abrasive grain in particular by the use of seeded gels has been demonstrated as in U.S. Pat. No. 4,623,364. By virtue of the intrinsic small particle size of the gel particles (less than 0.1 micron), and the facilitation, by the inclusion of nucleating seeds, of the conversion to alpha alumina, unique and valuable sintered bodies may be produced. Low sintering temperatures (e.g. 1200°–1400° C.), very fine microstructures (grain size less than 0.5 microns) and high density are realized when seeded gels are utilized. It has been further shown that such ceramic bodies are extremely good abrasive materials in many applications, often outperforming premium fused alumina or alumina-zirconia abrasives by a factor of 2 to 10 or more. The extremely fine crystal structure achievable by this process also allows the production of shaped alpha alumina bodies having substantially improved properties.

Micro crystalline boehmite is also useful for making porous gamma alumina bodies, e.g. for catalytic applications. All of these applications require boehmite having very fine particle sizes, generally less than 300 Angstroms, and preferably less than 100 or even 50 Angstroms in many applications.

The major disadvantage of the sol-gel abrasives currently is the high cost of the microcrystalline boehmite starting material. Because of this, the final product is costly and so markets are restricted to relatively specialized applications where relative performance/value is optimized. It is very desirable to increase the markets by lowering the cost of the abrasive by finding an economical source of microcrystalline boehmite and microcrystalline boehmite gels.

The availability of a low cost source of microcrystalline boehmite and microcrystalline gels would also be of great importance in making shaped alumina bodies such as porous gamma alumina bodies (e.g. for catalytic applications) and alpha alumina bodies such as structural parts and catalyst carriers.

Commercial production of such boehmite gels or gel precursors at present arises from two basic sources: (1) hydrolysis of high purity aluminum alkoxides, and, (2) precipitation from solutions of sodium aluminate. High costs arise from these methods because (a) users desire high purity material (hence expensive high purity materials or aluminum metal are used as a starting material) or distillation is performed or extensive washing is required, (b) loss of chemical reagents occurs (alcohol, sodium, salts, etc.), (c) elaborate safety precautions must be taken because of the use of flammable liquids or corrosive solutions, (d) low production rates are often encountered in certain processes since the gelability of boehmite is very sensitive to kinetics of precipitating, washing and drying.

Microcrystalline boehmite is normally supplied by manufacturers in powdered form and must be dispersed in water to form a sol. Since the manufacturer of the microcrystalline boehmite initially required drying the material to form the powder, substantial energy savings could be achieved if the drying step could be avoided.

It follows then, that by reducing or eliminating disadvantages such as listed above, significant cost advantages can be achieved.

SUMMARY OF THE INVENTION

In accordance with the invention we have found that suitable microcystalline boehmite and microcrystalline sols and gels can be made by hydrothermal treatment of other forms of alumina in the presence of boehmite seeding agents preferably at pH's of about 5 or lower but also, for certain applications, at a pH of 8 or higher. The process may be optimized by controlling the treatment conditions such as time, particle size, temperature, pressure, pH, and seeding agents.

To form the desired microsrystalline boehmite the boehmite seeding agent, preferably boehmite crystals, should be finer than 200 Angstroms in size and preferably finer than 100 or even 50 Angstroms. A relatively large amount of such seeds is needed, at least 7.5% by weight of the starting boehmite precursor measured as $Al_2O_3$.

In accordance with another important aspect of the invention, if it is desired to produce alpha alumina bodies from a seeded gel, the seed material for facilitating the conversion to alpha alumina may be included in the hydrothermal reaction mix during the conversion of the starting materials to microcrystalline boehmite. This not only obviates the need to dry the boehmite to powder form and then redisperse it to form a sol gel, but also results in a more intimate mixing of the seed material with the boehmite particles of the gel and better properties in the final sintered product.

DETAILED DESCRIPTION

Alumina trihydrate (gibbsite) may be converted by hydrothermal treatment in an autoclave according to the following equation:

$$Al(OH)_3 = AlOOH + H_2O \qquad (1)$$

We have found that reaction (1) can proceed smoothly to gelatinous microcrystalline boehmite at pressures of less than 200 psi and temperatures less than 200° C. The alumina source may be purified or as generated by the Bayer process or may simply be an ore such as calcined or uncalcined bauxite or clay.

In order to optimize gellation and retain the smallest possible ultimate boehmite crystallite size in the resultant gel it is necessary, in the preferred method, to acidify the slurry prior to hydrothermal treatment and to include boehmite seeds to promote the conversion. The conversion is retarded by additives such as phosphates or fluorides and these are to be avoided.

To obtain maximum dispersion of the microcrystalline boehmite sol produced by the method of the invention, it is preferred that the pH of the reaction mix at the start of the hydrothermal treatment be between about 2 and 4 although lower and higher pH's can also be used.

The conversion of the starting material to fine microcrystalline boehmite may also be carried out under basic conditions (pH8 or greater). Ammonia is the preferred reagent for this process. When carried out under these basic conditions the dispersibility of the product is greatly reduced and high temperature and pressure would normally be required to convert it to a solid body. Such product is quite useful, however, for many catalytic applications. The requisite temperature ranges for basic conversion are from 140° C. to 200° C. and 1 hour at temperature.

As is known, it is also possible to hydrothermally convert alumina trihydrate and other starting materials to boehmite at a neutral pH, about 7.5. Such a process takes much longer than that of the invention, however, and produces boehmite having coarser crystal structure. These processes have generally been used in the study of the behavior, transition, and stability of various forms of hydrated alumina under different conditions of temperature and pressure. Such studies have sometimes included the adding of boehmite seeds to the hydrothermal reaction mix to facilitate the nucleation of boehmite. In general, however, only relatively small numbers of relatively large seeds were used in order to obtain much larger boehmite crystals that could be easily studied by the researchers.

Autoclaving times in the method of the present invention may range from minutes to days depending, of course, on the starting materials, conditions, and desired products. Before or after discharging from the pressure vessel, alpha alumina seeds are added to promote the sintering phase in accordance with teachings such as U.S. Pat. No. 4,623,364, when alpha alumina end products are to be made.

The conversion is greatly accelerated by reducing the particle size of the starting materials; milling of most raw materials is therefore desirable. The crystallite size of the product boehmite is a function of the crystallite size of the seed boehmite. Hence, particularly if it is desired to maximize surface area as, for example, for boehmite to be used in making porous gamma alumina for catalytic applications, extremely fine boehmite seeds should be utilized (less than 100 Angstroms and preferably less than 50 Angstroms). Such fine boehmite seeds can be produced in various ways such as hydrolysis of aluminum alkoxides, neutralization of aluminum salt solutions, or hydrolysis of aluminum metal. U.S. Statutory Invention Registration H-189 published Jan. 6, 1987, discloses production of microcrystalline boehmite suitable as seed material in this invention from alumina by conversion to salts and decomposition followed by autoclaving.

Another method for generating fine seed is to hydrolyze fine alpha alumina particles. Normally such hydrolysis will convert the surface to boehmite and leave a small alpha alumina kernel in the center which can function as a seed in any subsequent conversion of the gel to alpha alumina.

Particularly when the boehmite is to be used to make alpha alumina ceramic bodies or abrasives, the most preferred method for carrying out the process is to also include submicron alpha alumina seeds in the autoclave during the conversion of the starting material to boehmite. Presence of the alpha seed material during the conversion to boehmite (alpha alumina monohydrate) results in a more uniform product when the boehmite sol is gelled and fired to produce alumina ceramic bodies or abrasive grains.

A still further major improvement can be achieved, when sodium ions or compounds are present in the starting materials, by removal of sodium or other alkali or alkaline earth contaminating cations. The preferred method is by the use of a solid exchange medium. The ion exchange is best carried out after transformation of the starting material to boehmite, when maximum solution of the impurity cations have been achieved. But in some cases it may be done after milling of the raw materials, for example, when desired cations are to be retained in the product gel.

When the alpha seeds instead are added after the autoclaving step the fired products contain some coarsely crystalline alpha alumina grains, an order of magnitude or more larger than the desired submicron alumina crystals. Such products, while suitable for some less critical end uses may be wholly unsatisfactory in other applications.

A somewhat similar problem arises when the soda content of the final boehmite solids exceeds about 0.1 weight %. Large elongated stick-like crystals which are believed to be beta alumina are present in the final product to disrupt the uniform fine microstructure of the majority of the product. Other alkali or alkaline earth cation contaminents are also known to be undesireable when pure sintered alpha alumina is desired.

To facilitate the ion exchange treatment and the removal of coarse solid impurities from the microcrystalline boehmite or unconverted material, for example, by decanting, filtering, or centrafuging, it is preferred to discharge boehmite from the autoclave as a sol. After such treatment the sol may be gelled by evaporation, dialysis, or by additivies such as magnesium salts.

EXAMPLE I

This example illustrates conversion of alumina trihydrate to boehmite gel, with fine alpha seed present, but with high soda content in the starting alumina hydrate.

50 g of ALCOA paper grade alumina trihydrate was mixed with 88 ml tap water, 3 ml of 14 w/o $HNO_3$, 5 grams of CONDEA PURAL SB microcrystalline boehmite alumina monohydrate, and 11 grams of alpha alumina slurry which contained 6.25% submicron alpha alumina crystals. The mix was autoclaved in a 1 liter vessel at 190° C. at autogeneous pressure for 3 hours.

A white gel was discharged which was further mixed in a high shear blender, dried at 90° C., crushed to $-24+54$ grain and fired in a Lindberg tube furnace for 5 minutes at 1400° C. The grains had hardness ranging from 11–15 GPa and a sodium oxide content of 0.3%.

The dried gel prior to sintering was boehmite by x-ray diffraction with an ultimate crystallite size of 120 Angstroms on the 020 plane.

If no alumina monohydrate was used the gelation was much slower and if no acid was used, virtually no gelation occurred.

If the autoclaving step was omitted, no ceramic grains could be manufactured as the slurry crumbled to fine powder.

EXAMPLE II

This example illustrates the use of lower soda alumina trihydrate.

In an M-18 Sweco mill 4 pounds of low soda ALCOA C-31 alumina trihydrate was mixed with 16 lbs. water and milled 24 hours.

500 ml of this slurry was mixed with 50 ml of 14 w/o $HNO_3$ and 10 g of Condea Pural SB mixed in. The mix was autoclaved at 190° C. for 3 hours and a white gel discharged after that time.

The gel was mixed 1 minute in a high shear blender and split in half. The first half was centrifuged at 5000 rpm for 3 minutes (residue discarded) and the other half was left as is. Alpha alumina seeds were added so as to give 1% by weight relative to the $Al_2O_3$ content of the gel. The samples were dried at 125° C. and crushed as above. The samples both were boehmite (XRD) with ultimate crystallite sizes of 125 Angstroms on the 020 plane and 235 Angstroms on the 120 plane. The grains were fired at various temperatures to yield hardnesses as shown below:

|  | Temperature °C. (4 min soak) | | |
|---|---|---|---|
|  | 1370 | 1450 | 1500 |
| Hardness as is | 10 | 17.5 | 16 |
| Centrifuged (GPa) | 16 | 18.5 | 17 |

Sodium oxide content was 0.13%. Such grains are useful in abrasive applications, but inferior by about 20% to abrasive made from alpha seeded Condea Pural boehmite, as taught in U.S. Pat. No. 4,623,364. Examination of the product indicated that about 20% of the abrasive grain (80 grit size) contained large alpha alumina crystals, and nonuniform areas. This example is also satisfactory for making ceramic bodies by molding or extrusion.

The following example illustrates the use of fine alpha alumina seed present during the conversion to boehmite and the reduction of cations, including sodium.

EXAMPLE III

Alcan H-10 alumina trihydrate was mixed with water to form a 25% solids mix and milled to break up into a fine powder. To 400 grams of this slurry was added 300 grams of a microcrystalline boehmite gel containing 20% boehmite solids having a crystal size of about 50 Angstroms made from Capatal powdered boehmite produced by Vista Chemical Co. A suspension of alpha seed (about 6% solids by weight) having a particle size such that most of the particles were below 0.05 microns in size was added to give a total of 1% by weight of seed based on the total alumina solids calculated as $Al_2O_3$. The pH of the mix was adjusted to 2 by addition of nitric acid (14 weight % solution). The slurry was then autoclaved in a sealed container at 160° C. for 2 hours. The reacted slurry was then allowed to settle and decanted, leaving a small amount of coarse material at the bottom of the vessel. A twenty five gram portion of a cation exchange resin (Dowex 50W x 8, available from Dow Chemical Co.) in bead form was added to the decanted reaction product. After 4 hours of stirring, the pH had dropped from 2 to 1, due to the exchange of hydrogen ions into the solutions from the resin. The solution was allowed to stand over the weekend and then after an additional four hours of stirring the pH had dropped to between 0.5 and 1. No further change in the pH occured after an additional 4 hours of stirring. The gel was then reduced in water content by heating, cast in sheets and dried. The broken-up dried gel was divided into three parts and fired for four minutes at 1370°, 1410°, and 1450° C. The hardness of the fired product was as follows:

| 1370° | 20.2 GPa |
|---|---|
| 1410° | 20.5 GPa |
| 1450° | 20.9 GPa |

The fired products were excellent abrasive and appeared devoid of coarse grains in any of the grits. The soda content was 0.05 wt. %. The average crystal size was about 0.2 microns. The crystals were essentially uniaxed with an axial ratio less than 2/1 of major to minor axis.

Although the reasons and detailed understanding for the effectiveness of an acidic (pH8 or less) or basic (pH 8 or greater) are not known for certain, an explanation on a simplified basis is as follows. In the case of acid pH catalyzed systems the following mechanism for dissolution of the trihydrate is suggested:

$$Al(OH)_3 + H^+ \rightleftharpoons Al(OH)^+_2 + H_2O.$$

The thus produced positive hydroxylated aluminum ions then solidify as monohydrate crystal onto the seeds present:

$$Al(OH)_2^+ \xrightarrow{seed} AlOOH + H^+.$$

In the case of the base catalyzed system, the dissolution mechanism is suggested to be as follows:

$$Al(OH)_3 + (OH)^- \rightleftharpoons Al(OH)^-_4.$$

The thus produced negative ions of hydroxylated aluminum, in the presence of seed react as follows:

$$Al(OH)_4^- \xrightarrow{seed} AlOOH + H_2O + (OH)^-,$$

to form microcrystalline boehmite.

In the case of the acid system the resulting product is in a gel or sol form. In the case of the alkaline system as in the following example, the ultimate boehmite particles have a greater tendency to agglomerate into larger polycrystals which do not readily disperse. Such product is less desireable for gel formation but is suitable as a source of microcrystalline boehmite powder or slurry.

The following is an example of the use of a basic catalyst to convert the starting material to microcrystalline boehmite. Instead of a gel, as in the acid catalysts, a slurry of agglomerates of microcrystalals was produced.

EXAMPLE IV

An aqueous dispersion of trihydrate with 38% by weight of microcrystalline boehmite seeds ($HNO_3$ dispersed) was made by mixing 210 grams of a 23% solids water dispersion of alumina trihydrate with 150 grams of acid dispersed, microcrystalline boehmite as seed. The mix also contained 1% (solids) of alpha seed. The mix was adjusted to a pH of 8 by addition of a 15% ammonia solution (3.5 ml). Additional water (630 ml) was added to keep the slurry fluid. The slurry was autoclaved for 2 hours at 180° C. All of the tryhydrate was found by X-ray diffraction to have been converted to microcrystalline monohydrate (boehmite). Similar results were achieved at a pH of 11 and a temperature of 140° C. for two hours. At 130° C. only partial conversion was achieved after two hours at pH 11.

The above examples may be subject to many variations. The autoclaving temperature is not critical but optimum results are achieved around 180° C. in terms of time required and degree of conversion of the starting alumina to microcrystalline boehmite. Temperatures of 130° to 195° C. may be employed. About two hours at 180° C. is adequate and longer times may be required at lower temperatures. Less time is required when a basic catalyst is employed.

The boehmite seed material should be as fine as possible. Theoretical considerations indicate that at least 7.5% by weight based on the alumina precursor solids (calculated as $Al_2O_3$) should be present.

Practically, 15 to 60% is found to be optimal but more may be employed. There is no critical upper limit but for reasons of economy, as little as necessary to achieve the desired results should be used. Thus a practical preferred range is 15 to 60% by weight. To avoid premature growth of the seed the addition of it may be delayed until the reaction mix is up to temperature. Then the seed may be injected under pressure.

While alpha alumina is the preferred seed for the growth of alpha alumina crystals, in some cases other seed material, such as alpha ferric oxide, may be used. It is believed that other seed materials having at least a 95% crystal lattice match to alpha alumina, such as chromium oxides, will also be effective in appropriate conditions.

As is clear from the examples above, the alpha alumina seed material is very desirably present during the conversion of the starting alumina to boehmite. It can be added to the starting mix or injected later, e.g. with a later addition of the boehmite seed. It is postulated that the effect of the addition of alpha seed before the conversion of the starting material to boehmite may be to discourage agglomeration of boehmite particles and/or to position alpha seeds inside such agglomerates as may form. In any event, such procedure stops the formation of wild coarse platy alpha alumina particles in the sintered alpha final product.

As used herein, the term autogenous pressure refers to the pressure developed in the closed autoclave at temperature, but does not exclude an increased pressure by injection of vapor or gas into the autoclave to further control total pressure and or composition in the reaction or a decreased pressure by bleeding off a portion of the steam.

A suitable way for removal of sodium ions to prevent the stick-like large crystal formations, is by the use of ion exchange. Alternatively solvent extraction, washing (employing microporous membranes), or other separation techniques may be employed where the sodium or other alkali ion content approaches 0.1% or higher. The final sodium or alkali ion content of the gel before sintering should be no more than 0.05 and preferably lower.

Various additives can be mixed with the boehmite, or with the boehmite precursor prior to the autoclaving reaction. Zirconia or a zirconium oxide precursor may be added prior to the reaction in the autoclave. Magnesium oxide precursors also may be added. Very small amounts of magnesium oxide or magnesium oxide precursor may be added (before or after autoclaving) to further inhibit crystal growth. Amounts as small as ¼% by weight can be effective. Or larger amounts (3 to 7%) can be added to form a spinel phase in the final sintered product, for specialized abrasive applications. If ion exchange is used to reduce the sodium content, this should be done prior to the addition of any soluble metal compounds although insoluble particles can be added earlier. Metal or metal oxide fibers can be added to the autoclave or to the product from the autoclave to fire as composite materials.

For ceramic article production, or for production of abrasives, the addition of zirconia or zirconia precursors to the gel or to the reaction mix can be effective to modify the abrasive or ceramic properties of fired products. Stabilization aids for the zirconia may also be included to control the zirconia crystal structure. Zirconia contents in the amount of 5 to 35% are desireable for some applications.

Extrusion of a stiff gel is a preferred method for making abrasive or ceramic products. When the acid catalyst is used a pH of 1 to 5 is possible but the preferred pH is from 2 to 5, with the most preferred being 2 to 4. When the basic catalyst is used the pH should be 8 or higher.

The boehmite produced from the autoclave may be separated from any unreacted precursor by decantation or by centrifuging. Preferably the conversion should be at least about 80%. If close enough to 100%, no separation may be needed.

The boehmite with or without such separation may be used to make abrasive grits or may be shaped as by extrusion, molding, or casting, to produce desired ceramic articles or mixed with other materials to form composites.

The alpha seed material should be as fine as possible, at least below 0.1 micron. The finer the seed the less required by weight. About 0.1% is the minimum when the seed is very fine and 1% (by weight of the final alpha alumina solids) is a good practical amount. More than 5% produces no advantage and is uneconomical. As a practical matter no limit is known for the size of the seed material but theoretically it should not be smaller than the unit cell of alpha alumina, and should not be so small as to be entirely destroyed by hydration during the autoclaving reaction, when it is added so as to be present in the reaction mix during the conversion of the boehmite precursor to boehmite.

The monocrystalline boehmite product of the invention should be less than 300 Angstroms (0.03 microns). Preferred products are less than 0.01 microns, and most preferred products 0.005 microns and finer. Thus the boehmite seed should be generally finer than 0.02 microns and preferably finer than 50 Angstroms (0.005 microns). When the product from the autoclave is fine enough a portion of it may be used as seed for the next batch. Such process of using product as seed can continue until the product contains particles which are too large (more than 0.03 microns).

The boehmite product of this invention is also useful for producing porous products which are not necessarily converted all the way to alpha alumina upon sintering. For example, catalysts and catalyst carriers may be produced from the gel directly or by use of the gel as a bond for other ceramics or metals. When so employed, if alpha alumina is not the desired final product, the alpha seed addition may be eliminated. Such products are well known in the catalyst art and are presently produced from commercial monocrystalline boehmite.

The temperature and pressure for the conversion of the boehmite precursor to boehmite, i.e. 130° C. to 195° C. at the autogenous pressure of water vapor, are within the boehmite region of the alumina-water phase diagram. In fact the stable region is from 120° to about 300°. Without the use of an acid pH, or a pH of 8 or higher and the employment of boehmite seed, the reaction, however, has been found to be ineffective to produce the desired microcrystalline boehmite.

The preferred boehmite precursor is hydrated alumina such as gibbsite but other precursors such as diaspore or other hydrates or aluminum alkoxides can be employed in part or as the sole precursor.

Although nitric acid is the preferred acid to supply hydrogen ions for the acid catalysis, other acids such as acetic, hydrochloric, or formic may be used. In basic catalysis, ammonium hydroxide is preferred, but organic amines can be used, and even sodium hydroxide if the sodium ions are removed after the reaction is completed.

What is claimed is:

1. A method of making a microcrystalline boehmite product comprising heating under autogenous pressure a boehmite alumina precursor in an aqueous medium having a pH selected from a value of 5 or less and 8 or higher and in the presence of boehmite seed particles finer than 0.02 microns, said seed particles being present in an amount greater than 7.5% by weight of the precursor alumina, calculated as $Al_2O_3$, said heating being carried out above 130° C. for a time sufficient to substantially convert said precursor to microcrystalline boehmite.

2. A method as in claim 1 in which said pH is 5 or less and at least 0.1% by weight of submicron alpha alumina seed is in said aqueous medium during the conversion of the boehmite precursor to microcrystalline boehmite.

3. A method as in claim 1 in which said pH is 5 or less and said boehmite seed particles are present in an amount of at least 15% by weight of the precursor alumina, calculated as $Al_2O_3$.

4. A method as in claim 1 further including the step of removing alkali and alkaline earth ions from the aqueous medium.

5. A method as in claim 2 further including the step of removing alkali and alkaline earth ions from the aqueous medium and firing the boehmite product, to produce abrasive grits.

6. A method as in claim 3 further including the steps of shaping the boehmite product, and firing the shaped product to produce an article of anhydrous alumina.

7. A method as in claim 3 in which said boehmite seed particles are finer than 100 Angstroms and further including the step of firing the boehmite product to produce gamma alumina.

8. A method as in claim 7 wherein said boehmite seed particles are finer than 50 Angstroms.

9. A method as in claim 2 further including the steps of adding a crystal growth inhibitor to said aqueous medium prior to the conversion of said precursor to microcrystalline boehmite.

10. A method as in claim 9 wherein said crystal growth inhibitor is magnesium oxide or a magnesium oxide precursor.

11. A method as in claim 2 further including the step of adding zirconia or zirconium oxide precursor to said aqueous medium prior to the conversion of said precursor to microcrystalline boehmite.

12. A method as in claim 1 further including the step of adding said boehmite seed particles to said aqueous medium after said medium has been heated to a temperature of at least 120° C.

13. A method as in claim 1 further including the step of providing in said aqueous medium submicron alpha alumina seed particles having a hydrated boehmite surface prior to the conversion of said precursor to microcrystalline boehmite.

14. The method of claim 4 wherein said step of removing alkali and alkaline earth ions includes the step of contacting said aqueous medium with an ion exchange medium.

15. A method of producing alpha alumina bodies comprising the steps of:
    reacting hydrated alumina boehmite precursor in an autoclave in the presence of acidified water, boehmite seed material having a crystal size less than 0.02 microns, and submicron seed material of a type and in an amount effective to promote the formation of alpha alumina upon firing, while maintaining the temperature and pressure at conditions under which boehmite is a stable phase for a time sufficient to convert the major portion of said precursor to microcrystalline boehmite;
    firing said microcrystalline boehmite at temperatures sufficient to convert said boehmite to alpha alumina.

16. The method of claim 15 further including the step of shaping said microcrystalline boehmite prior to firing.

17. The method of claim 15 wherein the step of firing said boehmite includes the step of drying and crushing said microcrystalline boehmite prior to firing at a temperature sufficient to form alpha alumina.

18. The method of claim 15 wherein said acidified water has a pH of 5 or less.

19. The method of claim 13 further including the step of removing alkali and alkaline earth ions prior to firing.

20. The method of producing gamma alumina bodies comprising the steps of:
    reacting a hydrated alumina boehmite precursor in an autoclave in the presence of acidified water and boehmite seed material having a crystal size less than 0.02 microns while maintaining the temperature and pressure at conditions under which boehmite is a stable phase for a time sufficient to convert the major portion of said precursor to microcrystalline boehmite,
    firing said microcrystalline boehmite for a time and at a temperature effective to convert said boehmite to gamma alumina.

21. The method of claim 20 further including shaping said boehmite prior to firing.

22. The method of claim 20 further including the step of removing alkali and alkaline earth ions prior to firing.

23. A method of producing microcrystalline boehmite comprising reacting in an autoclave a hydrated alumina boehmite precursor in the presence of water and boehmite seed material having a crystal size less than 0.02 microns, the temperature, pressure, and pH being maintained at conditions under which boehmite is a stable phase for a time sufficient to convert the major portion of said precursor to microcrystalline boehmite.

24. A method of producing high purity microcrystalline boehmite comprising the steps of
    (1) providing an aqueous medium containing an aluminum oxide precursor of boehmite and at least 5% by weight, based on alumina precursor solids calculated as trihydrate, of boehmite seed material having a particle size finer than 0.02 microns,
    (2) heating in an autoclave said medium under at least autogenous pressure to convert said precursor to boehmite, and
    (3) removing metal cations from said aqueous medium by contact of said medium with an ion exchange medium.

25. A method as in claim 24 further including the step of adding submicron alpha alumina nucleation material in the amount of at least 0.1%, by weight of the total alumina calculated as $Al_2O_3$, to the medium before complete conversion of the precursor to boehmite.

26. A method as in claim 24 wherein said step of providing includes the step of adding said boehmite seed material after the aqueous medium has been heated to at least 120°.

27. A method of producing an aluminous article comprising firing a boehmite produced by the method of claim 25 in admixture with a material selected from the group consisting of oxides of magnesium, oxides of zirconia, ceramic or metal fibers, and mixtures thereof.

* * * * *